(12) United States Patent
Clay et al.

(10) Patent No.: US 12,086,780 B2
(45) Date of Patent: Sep. 10, 2024

(54) SYSTEMS AND METHODS FOR AUDITING REGISTERS

(71) Applicant: Walmart Apollo, LLC, Bentonville, AR (US)

(72) Inventors: Kevin Philip Clay, Centeron, AR (US); Catherine Antill, San Bruno, CA (US); Jingru Zhou, San Jose, CA (US); Tzu-Yen Wang, San Mateo, CA (US); Uday B. Akella, San Carlos, CA (US); Hui-Min Chen, Pleasanton, CA (US); Ashley Renee Renee Greehey, Bradenton, FL (US); Chuying Ma, Sunnyvale, CA (US); David Andrew Splittorff, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 365 days.

(21) Appl. No.: 17/644,675

(22) Filed: Dec. 16, 2021

(65) Prior Publication Data
US 2023/0196324 A1    Jun. 22, 2023

(51) Int. Cl.
*G06Q 20/20* (2012.01)
*G06N 5/01* (2023.01)

(52) U.S. Cl.
CPC ............. *G06Q 20/202* (2013.01); *G06N 5/01* (2023.01); *G06Q 20/206* (2013.01); *G06Q 20/209* (2013.01)

(58) Field of Classification Search
CPC .. G06Q 20/202; G06Q 20/206; G06Q 20/209; G06N 5/01
See application file for complete search history.

(56) References Cited

U.S. PATENT DOCUMENTS 5,832,458 A    11/1998  Jones
8,272,563 B1*  9/2012  Folk ...................... G07D 11/36
                                                    902/8

(Continued)

FOREIGN PATENT DOCUMENTS

WO    2017146694 A1    8/2017

OTHER PUBLICATIONS

"Cashier Audits and Assigning Cash Drawers (Quick Service)", Microsale Zendesk, 2021, retrieved Oct. 28, 2021, 5 pages.

*Primary Examiner* — A. Hunter Wilder
*Assistant Examiner* — Joseph M Mutschler
(74) *Attorney, Agent, or Firm* — Morgan, Lewis & Bockius LLP; Manita Rawat (57) ABSTRACT

This application relates to systems and methods for auditing registers. In some examples, a system comprises registers, a recycling device, handheld computing devices, and retailer computing devices. The retailer computing devices may be configured to store a decision model, receive a calculated monetary position and activity data for one of the registers, generate a first associate record based at least on the decision model and one or more of the calculated monetary position and the activity data, generate a second associate record based at least on the decision model and historical behavioral data for one or more associates, generate a first audit alert record based at least on the second associate record and the decision model, send audit alerts to the handheld computing devices, and send the first audit alert record to the database.

20 Claims, 3 Drawing Sheets

(56) References Cited

U.S. PATENT DOCUMENTS

| | | | |
|---|---|---|---|
| 2008/0149706 A1 | 6/2008 | Brown et al. | |
| 2015/0127414 A1* | 5/2015 | Geffert | G06Q 10/0635 705/7.28 |
| 2016/0162860 A1* | 6/2016 | Gonzalez | G06Q 20/203 705/16 |

* cited by examiner

SYSTEMS AND METHODS FOR AUDITING REGISTERS

TECHNICAL FIELD

The disclosure relates generally to systems and methods for auditing registers, and more specifically, auditing registers in a retail storefront.

BACKGROUND

Retail storefronts often have multiple cash registers that require auditing to confirm whether the registers contain the correct amount of money based on the retail transactions that took place at that register. However, the current register auditing process is often time-consuming (e.g., retailers perform large numbers of unnecessary audits), disruptive (e.g., retailers must close the register being audited), and inconsistent across different retail locations (e.g., different locations may conduct different numbers of audits each day). For example, in some stores, a manager may receive a list of registers to audit based on the previous day's shortages. Then the manager may take a money counting device to a particular register and close that register while they count the money in the register. Such a counting process would take place in public view. After the manager has counted the money in the register, the manager would need to plug the money counting device into the retailer's network to upload the results to a retailer database in order to keep current the list of registers to audit. However, the results of the audit may not be reviewable until the next business day. As such, there are opportunities to improve the register auditing process.

SUMMARY

The embodiments described herein are directed to systems and methods for efficiently auditing registers. The present invention provides rules-based systems and methods that allow retailers to consistently and efficiently audit registers in their retail storefronts. The invention eliminates the inefficiency of lane closures during register audits and limits the number of unnecessary audits. Further, the use of a recycling device provides immediate feedback to a user (e.g., manager or team lead) on the monetary position (e.g., long/short position) for a particular register that has been audited.

In accordance with various embodiments, exemplary systems may be implemented in any suitable hardware or hardware and software, such as in any suitable computing device. In some embodiments, a system is provided that comprises one or more registers, a recycling device, one or more handheld computing devices running a mobile application, and one or more retailer computing devices. Each register may be configured to house a respective first compartment. The recycling device may comprise a housing, one or more counting devices, and a processor. The housing may be configured to hold one or more first compartments. The recycling device may be configured to receive each respective first compartment from the one or more registers, and the one or more counting devices may be configured to count the money in each respective first compartment. The processor may be configured to calculate a monetary position for each of the one or more registers and transmit each respective calculated monetary position to a database. The one or more retailer computing devices may be configured to store a decision model comprising one or more audit rules and receive the respective calculated monetary position for at least one of the one or more registers. The one or more retailer computing devices may be further configured to receive activity data for at least one of the one or more registers. The one or more retailer computing devices may be further configured to generate a first associate record based at least on the decision model and one or more of the respective calculated monetary position for one of the one or more registers and the respective activity data for one of the one or more registers. The one or more retailer computing devices may be further configured to generate a second associate record based at least on the decision model and historical behavioral data for one or more associates. The one or more retailer computing devices may be further configured to generate a first audit alert record based at least on the second associate record and the decision model. The one or more retailer computing devices may be further configured to send one or more audit alerts to the one or more handheld computing devices. The audit alert may indicate which of the one or more registers to audit, and the mobile application may be configured to display a notification to a user indicating which of the one or more registers to audit. The one or more retailer computing devices may be further configured to send the first audit alert record to the database.

In some embodiments, a method is provided that comprises storing a decision model comprising one or more audit rules and receiving a respective calculated monetary position for one or more registers. The method may further comprise receiving activity data for at least one of the one or more registers. The method may further comprise generating a first associate record based at least on the decision model and one or more of the respective calculated monetary position for one of the one or more registers and the respective activity data for one of the one or more registers. The method may further comprise generating a second associate record based at least on the decision model and historical behavioral data for one or more associates. The method may further comprise generating a first audit alert record based at least on the second associate record and the decision model. The method may further comprise sending one or more audit alerts to one or more handheld computing devices running a mobile application. The audit alert may indicate which of the one or more registers to audit, and the mobile application may be configured to display a notification to a user indicating which of the one or more registers to audit. The method may further comprise sending the first audit alert record to a database.

In some embodiments, a non-transitory computer readable medium has instructions stored thereon, where the instructions, when executed by at least one processor, cause a computing device to perform operations that comprise storing a decision model comprising one or more audit rules and receiving a respective calculated monetary position for one or more registers. The operations may further comprise receiving activity data for at least one of the one or more registers. The operations may further comprise generating a first associate record based at least on the decision model and one or more of the respective calculated monetary position for one of the one or more registers and the respective activity data for one of the one or more registers. The operations may further comprise generating a second associate record based at least on the decision model and historical behavioral data for one or more associates. The operations may further comprise generating a first audit alert record based at least on the second associate record and the decision model. The operations may further comprise sending one or more audit alerts to one or more handheld computing devices running a mobile application. The audit alert may indicate which of the one or more registers to audit, and the mobile application may be configured to display a notification to a user indicating which of the one or more registers to audit. The operations may further comprise sending the first audit alert record to a database.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
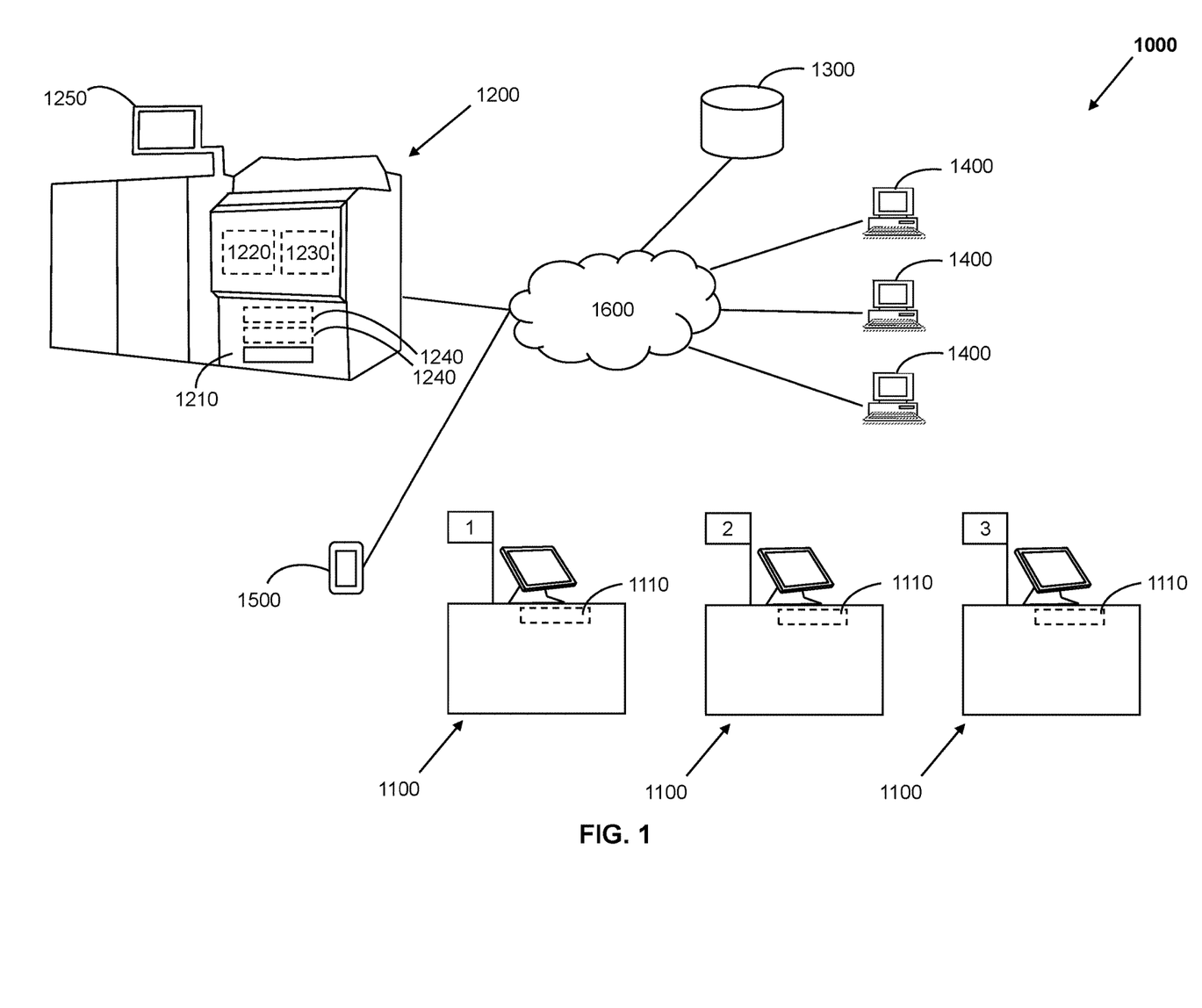
FIG. 1 is a block diagram of a register audit system in accordance with some embodiments.

Turning to the drawings, FIG. 1 illustrates a block diagram of a register audit system 1000. The system 1000 comprises one or more registers 1100 (e.g., three registers 1100, as shown in FIG. 1). Each of the registers 1100 is configured to house a first compartment 1110. In some embodiments, the first compartment 1110 may be a till configured to hold coins and cash. The registers 1100 may be configured to print a receipt showing a recap of sales at the register 1100 over a period of time. The system 1000 further comprises a recycling device 1200 (e.g., a cash recycler). The recycling device 1200 and registers 1100 may be located in a retail storefront. Examples of such retail storefronts may include, but are not limited to, hypermarkets, warehouse stores, department stores, grocery stores, and specialty stores.

The recycling device 1200 comprises a housing 1210, one or more counting devices 1220, and a processor 1230. The housing 1210 is configured to hold one or more first compartments 1110. The housing 1210 may also be configured to hold a plurality of replacement compartments 1240 (e.g., replacement tills), as shown in FIG. 1. The one or more counting devices 1220 may include one or more of a coin counter and a bill counter. The recycling device 1200 is configured to receive each respective first compartment 1110 (e.g., a till) from the one or more registers 1100, and the one or more counting devices 1220 are configured to count the money in each respective first compartment 1110. For example, a user of the register audit system 1000 (e.g., a team lead in the retail storefront) may take a first compartment 1110 from a register 1100 (e.g., Register 1) to the recycling device 1200 when that register 1100 needs to be audited.

The processor 1230 is configured to calculate a monetary position (e.g., long/short position) for each of the one or more registers 1100 and transmit each respective calculated monetary position to a database 1300. The monetary position may be a long/short position for the register (e.g., the register 1100 is short $50).

In some embodiments, the recycling device 1200 may further comprise a graphical user interface (GUI) 1250. The GUI 1250 may include a biometric scanner. The GUI 1250 may be configured to display the respective calculated monetary position to a user (e.g., a team lead in the retail storefront). In some embodiments, the recycling device 1200 may further comprise a printer configured to print receipts. In some embodiments, the recycling device 1200 may be configured to print a receipt that indicates the respective calculated monetary position for a register 1100.

The register audit system 1000 further comprises one or more retailer computing devices 1400 and one or more handheld computing devices 1500 running a mobile application 1510. In some embodiments, the one or more retailer computing devices 1400 may be remote from the retail storefront, and the recycling device 1200 and handheld computing device 1500 may be located within the retail storefront. The one or more retailer computing devices 1400 are coupled to the handheld computing device 1500 and recycling device 1200 via a communication network 1600. In some embodiments, the one or more handheld computing devices 1500 may be WiFi-enabled. A user (e.g., a team lead in the retail storefront) may keep a handheld computing device 1500 with them during their shift and monitor it for notifications 1530. The one or more retailer computing devices 1400, one or more handheld computing devices 1500, recycling device 1200, and database 1300 may be configured to communicate with one another via a communication network 1600. In some embodiments, registers 1100 may be configured to communicate with other devices in the register audit system 1000 via the communication network 1600. In some embodiments, the communication network 1600 may be a wireless network.

The one or more retailer computing devices 1400 are configured to store a decision model comprising one or more audit rules. This decision model enables the auditing process to be consistent across all of a retailer's storefronts by applying the same audit rules at each storefront. In some embodiments, the audit rules may indicate that the retailer computing device 1400 should send one or more audit alerts 1520 if the number of associates (e.g., cashiers) on a particular register 1100 is greater than or equal to 5 during a time period (e.g., 24 hours). The retailer computing device 1400 may send the audit alert 1520 after the fifth associate signs off of the register 1100 (e.g., in step 2700 of method 2000, described below). In some embodiments, the audit rules may indicate that the retailer computing device 1400 should send one or more an audit alerts 1520 if the number of no-sale transactions (e.g., when an associate accesses the first compartment 1110 without a sale taking place) by the same associate on a particular register is greater than or equal to 3 during a period of 3 hours or less. The retailer computing device 1400 may send the audit alert 1520 after the associate signs off (e.g., in step 2700 of method 2000, described below). In some embodiments, the number of no-sale transactions may be limited to those that were approved remotely (e.g., if a physical key was turned to access the first compartment 1110, the transaction would not be counted in the number of no-sale transactions). In some embodiments, the audit rules may indicate that the retailer computing device 1400 should send one or more audit alerts 1520 if the net cash in or out value for a respective register 1100 during a time period (e.g., 24 hours) is greater than a threshold value (e.g., $8,000). In some embodiments, the audit rules may indicate that the retailer computing device 1400 should send one or more audit alerts 1520 if value of money in a register 1100 is greater than a threshold value (e.g., $5,000). This rule may be limited to particular registers 1100 (e.g., not including registers 1100 at a customer service desk or money center). In some embodiments, the audit rules may indicate that the retailer computing device 1400 should send one or more audit alerts 1520 if the calculated monetary position for a particular register 1100 indicated that the register 1100 was long or short by a threshold amount (e.g., $10 or more).

In some embodiments, the audit rules may indicate that if more than a threshold number of associates (e.g., 10 associates) are on the first associate record, the retailer computing device 1400 should remove any associates who were audited yesterday when generating the second associate record (e.g., in step 2500 of method 2000, described below). This enables the register audit system 1000 to limit the number of unnecessary audits. In some embodiments, the second associate record is generated daily.

In some embodiments, the audit rules may indicate that audit alerts 1520 may only be sent during a particular time window (e.g., 10:00 am to 6:00 pm store local time). In some embodiments, the audit rules may indicate a maximum number of audit alerts 1520 that may be sent per day in a particular store. In some embodiments, the audit rules may indicate a maximum number of times that an associate (e.g., cashier) may be audited per day (e.g., once per day). In some embodiments, the audit rules may indicate that an audit alert 1520 regarding a particular associate should be sent out a certain amount of time after that associate signs in (e.g., 2 hours after that associate signs in).

In some embodiments, the historical behavioral data for one or more associates may comprise a score for each respective associate. The score may be based on the number of times the associate has triggered an audit alert 1520 to be sent during a time period (e.g., the past 7 days). The decision model may use this score to prioritize which associates to audit.

The one or more retailer computing devices 1400 are configured to receive the respective calculated monetary position (e.g., calculated long/short position) for at least one of the one or more registers 1100. The one or more retailer computing devices 1400 are further configured to receive activity data for at least one of the one or more registers 1100. The one or more retailer computing devices 1400 are configured to generate a first associate record based at least on the decision model and one or more of the respective calculated monetary position for one of the one or more registers 1100 (e.g., a long/short position showing that Register 1 is $100 short) and the respective activity data for one of the one or more registers 1100 (e.g., the value of money in Register 1 is $6,000). The one or more associates may be cashiers. The first associate record may be a preliminary list of associates to audit, and the associates on said list may be those who recently worked on a particular register 1100 (e.g., Register 1) that triggered one of the audit rules (e.g., by having a long/short position above a threshold of $10 or by having a value of money in the register above a threshold of $5,000). In some embodiments, the activity data includes one or more of: a number of associates (e.g., cashiers) on a respective register 1100 during a first time period, a number of no-sale transactions at a respective register 1100 during a second time period, a net cash in or out value for a respective register 1100 during a third time period, and a value of money in a respective register 1100.

The one or more retailer computing devices 1400 are further configured to generate a second associate record based at least on the decision model and historical behavioral data for one or more associates. The second associate record may be a refined list of associates to audit. For example, if an associate on the first associate record was audited the prior business day, that associate may not be included on the second associate record, in accordance with the audit rules of the decision model.

The one or more retailer computing devices 1400 are configured to generate a first audit alert record based at least on the second associate record and the decision model. For example, the audit rules may indicate that a register may only be audited once per day, and there may be two associates on the second associate record that will be operating the same register that day. When that is the case, the first audit alert record may only list one audit alert 1520 for the register in order to promote a more efficient auditing process. The first audit alert record may be a list of audit alerts 1520 to send to handheld computing device 1500. A register 1100 indicated in the audit alert 1520 would be a register that an associate listed in the second associate record is operating or recently operated. In some embodiments, the first audit alert record may be generated daily. The one or more retailer computing devices 1400 are further configured to send the first audit alert record to the database 1300. In some embodiments, the database 1300 may be configured to store a second audit alert record comprising a list of all recent audit alerts 1520 sent to the one or more handheld computing devices 1500. In some embodiments, the second associate record may be further based on the second audit alert record in order to limit the number of unnecessary audits.

Figure 3A:
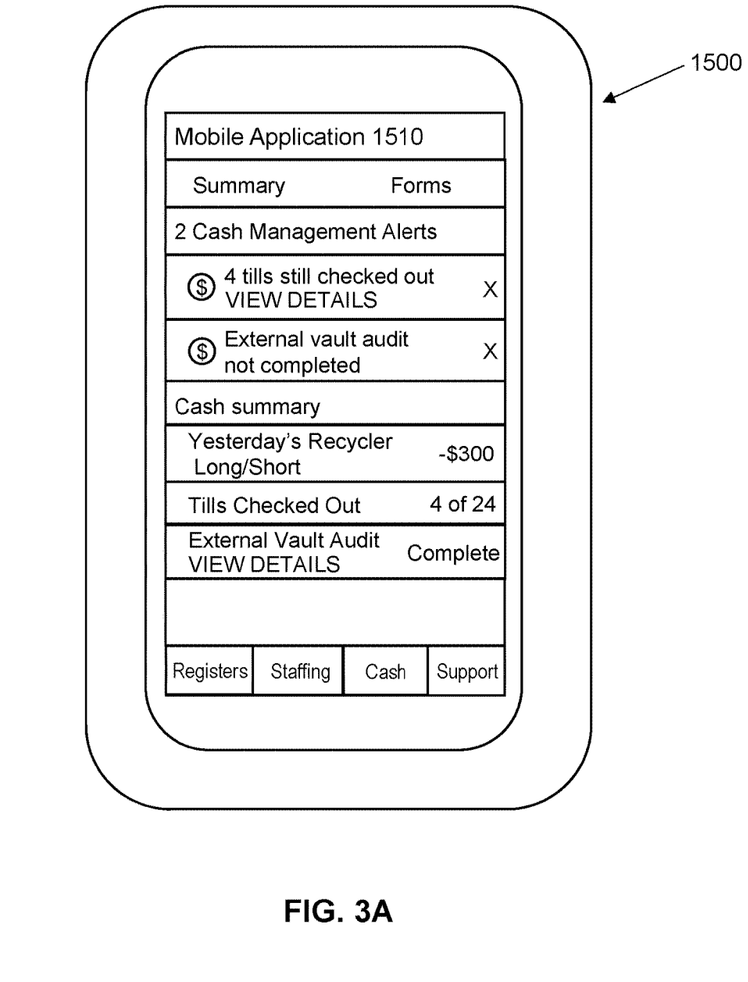
FIG. 3A is a block diagram of a handheld computing device in accordance with some embodiments.
Figure 3B:
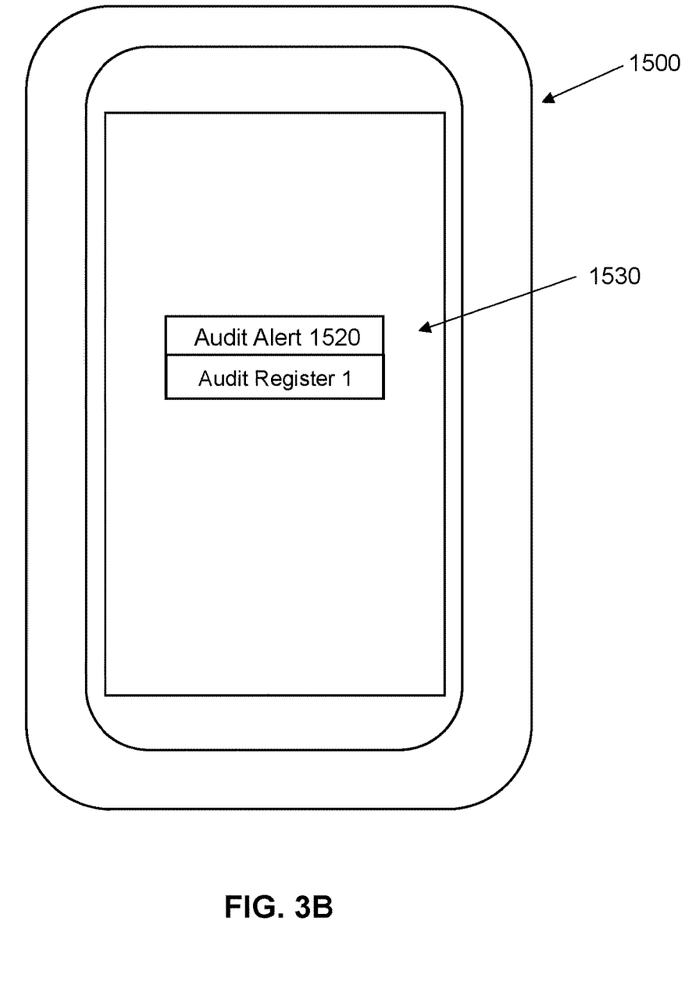
FIG. 3B is a block diagram of a handheld computing device in accordance with some embodiments.

The one or more retailer computing devices 1400 are further configured to send one or more audit alerts 1520 to one or more handheld computing devices 1500 running a mobile application 1510, as illustrated in FIGS. 3A and 3B.

FIG. 3A illustrates a mobile application 1510 on a handheld computing device 1500 in accordance with some embodiments. FIG. 3B illustrates notification 1530 of an audit alert 1520 on a handheld computing device 1500 in accordance with some embodiments. The audit alert 1520 indicates which of the one or more registers 1100 to audit. The exemplary audit alert 1520 in FIG. 3B indicates that "Register 1" should be audited. The mobile application 1510 is configured to display a notification 1530 to a user indicating which of the one or more registers 1100 to audit. In some embodiments, the user may be a team lead. When the user sees the notification 1530 on handheld computing device 1500, the user may check out a replacement compartment 1240 from the recycling device 1200 and take it to the register 1100 (e.g., Register 1) indicated in the audit alert 1520. The user may print a receipt showing a recap of the sales at the register 1100 (e.g., Register 1) over a period of time and replace the first compartment 1110 in the register 1100 with the replacement compartment 1240. This allows the register 1100 to remain open during an audit. The user may then take the first compartment 1110 and the receipt showing a recap of the sales at the register 1100 to the recycling device 1200 and check that first compartment 1110 into the recycling device 1200. At the recycling device 1200, the user may also scan the receipt showing a recap of the sales. The recycling device 1200 may then calculate a monetary position (e.g., a long/short position) for the register 1100 by counting the money in the first compartment 1110 and comparing the counted value to the value of sales indicated on the receipt showing the recap of the sales at the register 1100. The recycling device 1200 can display the calculated monetary position to the user immediately after calculating it. In some embodiments, the recycling device 1200 may print a receipt showing the calculated monetary position. In some embodiments, the recycling device 1200 may display the calculated monetary position on the GUI 1250. In some embodiments, the auditing steps performed by the user could be performed using any known method to one of ordinary skilled in the art.

In some embodiments, if the calculated monetary position is short (e.g., the amount of money in the first compartment 1110 is $20 lower than it should be based on the receipt showing the sales recap) or long (e.g., the amount of money in the first compartment 1110 is $20 higher than it should be based on receipt showing the sales recap), the retailer computing device 1400 may receive the calculated monetary position and generate a first associate record for that register based on the decision model and the calculated monetary position. Ultimately, the retailer computing device 1400 may send an audit alert to a user's handheld computing device 1500 (e.g., at step 2700 in method 2000). In some embodiments, the calculated monetary position may be displayed at the recycling device 1200 (e.g., on GUI 1250), and the user may follow up on the calculated monetary position using a research guide (e.g., using a long/short research guide). In some embodiments, the user may escalate issues with the calculated monetary position to a front end assistant manager for follow-up or correction action as needed or to an asset protection assistant manager for additional research. In some embodiments, additional research may involve reviewing closed-circuit television footage of specific areas in the retail storefront (e.g., the area around a particular register 1100).

In some embodiments, the one or more retailer computing devices 1400 are further configured to automatically send a daily email including a summary of daily audit performance. In some embodiments, the one or more retailer computing devices 1400 are further configured to send daily audit results to a retailer database (e.g., database 1300) at the end of the business day or after all audit alerts 1520 have been sent for the day.

Figure 2:
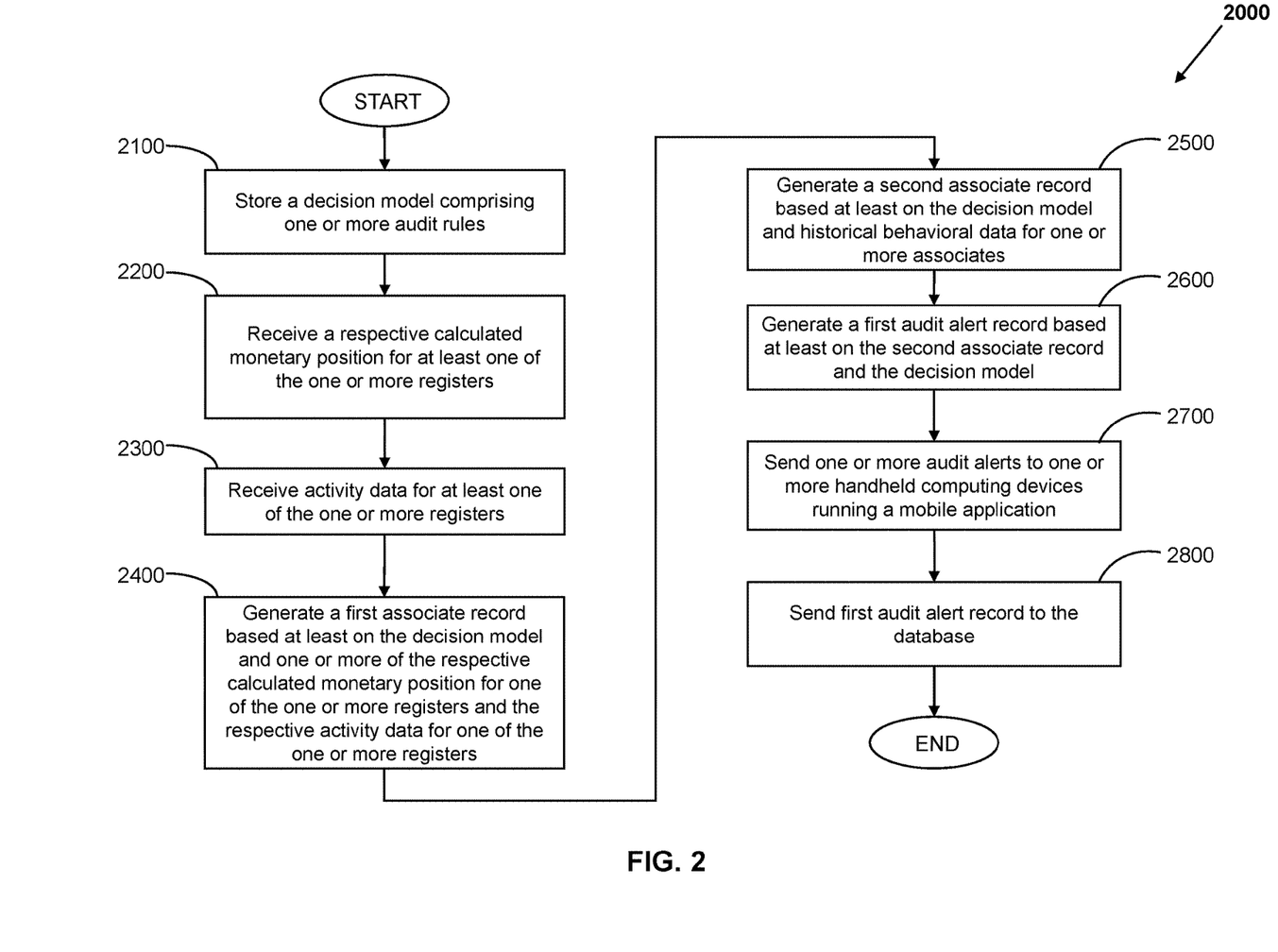
FIG. 2 is a flowchart of an example method that can be carried out by the retailer computing device of FIG. 1 in accordance with some embodiments.

FIG. 2 is a flowchart of an example method 2000 that can be carried out by a retailer computing device 1400. Beginning at step 2100, a computing device, such as retailer computing device 1400, stores a decision model comprising one or more audit rules (described above with respect to FIG. 1). At step 2200, the computing device receives a respective calculated monetary position (e.g., long/short position) for at least one of the one or more registers 1100.

Proceeding to step 2300, the computing device receives activity data for at least one of the one or more registers 1100. In some embodiments, the activity data includes one or more of: a number of associates on a respective register 1100 during a first time period, a number of no-sale transactions at a respective register 1100 during a second time period, a net cash in or out value for a respective register 1100 during a third time period, and a value of money in a respective register 1100. In some embodiments, the first time period, second time period, and third time period may be the same. At step 2400, the computing device generates a first associate record based at least on the decision model and one or more of the respective calculated monetary position for one of the one or more registers 1100 and the respective activity data for one of the one or more registers 1100.

At step 2500, the computing device generates a second associate record based at least on the decision model and historical behavioral data for one or more associates (e.g., cashiers). At step 2600, the computing device generates a first audit alert record based at least on the second associate record and the decision model.

At step 2700, the computing device sends one or more audit alerts 1520 to one or more handheld computing devices 1500 running a mobile application 1510. In some embodiments, the one or more audit alerts 1520 are sent to the one or more handheld computing devices 1500 via a notification service (e.g., a retailer's notification service). The audit alert 1520 indicates which of the one or more registers 1100 to audit, and the mobile application 1510 is configured to display a notification 1530 to a user indicating which of the one or more registers 1100 to audit. At step 2800, the computing device sends the first audit alert record to a retailer database (e.g., database 1300). The method then ends.

In some embodiments, method 2000 may further include a step where the computing device receives a second audit alert record comprising a list of all recent audit alerts 1520 sent to the one or more handheld computing devices 1500. In some embodiments, the second associate record is further based on the second audit alert record. In some embodiments, method 2000 may further include a step where the computing device automatically sends a daily email including a summary of daily audit performance. In some embodiments, method 2000 may further include a step where the computing device sends daily audit results to a retailer database (e.g., database 1300) at the end of the business day or after all audit alerts 1520 have been sent for the day.

Although the methods described above are with reference to the illustrated flowchart, it will be appreciated that many other ways of performing the acts associated with the methods can be used. For example, the order of some operations may be changed, and some of the operations described may be optional.

In addition, the methods and systems described herein can be at least partially embodied in the form of computer-implemented processes and apparatus for practicing those processes. The disclosed methods (e.g., method 2000) may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
    one or more registers, wherein each register is configured to house a respective first compartment;
    a recycling device, wherein the recycling device comprises:
        a housing configured to hold one or more first compartments;
        one or more counting devices, wherein the recycling device is configured to receive each respective first compartment from the one or more registers and the one or more counting devices are configured to count money in each respective first compartment; and
        a processor configured to calculate a monetary position for each of the one or more registers and transmit each respective calculated monetary position to a database;
    one or more handheld computing devices running a mobile application; and
    one or more retailer computing devices, wherein the one or more retailer computing devices are configured to:
        store a decision model comprising one or more audit rules;
        receive the respective calculated monetary position for at least one of the one or more registers;
        receive activity data for at least one of the one or more registers;
        generate a first associate record based at least on the decision model and one or more of the respective calculated monetary position for one of the one or more registers and the respective activity data for one of the one or more registers;
        generate a second associate record based at least on the decision model and historical behavioral data for one or more associates;
        generate a first audit alert record based at least on the second associate record and the decision model;
        send the one or more audit alerts to the one or more handheld computing devices, wherein each audit alert indicates which of the one or more registers to audit, and
    wherein the mobile application is configured to display a notification to a user indicating which of the one or more registers to audit; and
    send the first audit alert record to the database.

2. The system of claim 1, wherein the recycling device further comprises a graphical user interface.

3. The system of claim 2, wherein the graphical user interface includes a biometric scanner.

4. The system of claim 2, wherein the graphical user interface is configured to display the respective calculated monetary position.

5. The system of claim 1, wherein the activity data includes one or more of: a number of associates on a respective register during a first time period, a number of no-sale transactions at a respective register during a second time period, a net cash in or out value for a respective register during a third time period, and a value of money in a respective register.

6. The system of claim 1, wherein the one or more handheld computing devices are WiFi-enabled.

7. The system of claim 1, wherein the user is a team lead.

8. The system of claim 1, wherein the database is configured to store a second audit alert record comprising a list of all recent audit alerts sent to the one or more handheld computing devices.

9. The system of claim 8, wherein the second associate record is further based on the second audit alert record.

10. The system of claim 1, wherein the recycling device is configured to print a receipt that indicates the respective calculated monetary position.

11. A method comprising:
    at a recycling device including a housing configured to hold one or more first compartments:
        receiving, from one or more registers, each respective first compartment;
        counting, at one or more counting devices of the recycling device, money in each respective first compartment;
        calculating, at a processor, a monetary position for each of one or more registers and transmitting each respective calculated monetary position to a database;
    at one or more retailer computing devices:
        storing a decision model comprising one or more audit rules;
        receiving a respective calculated monetary position for one or more registers;
        receiving activity data for at least one of the one or more registers;
        generating a first associate record based at least on the decision model and one or more of the respective calculated monetary position for one of the one or more registers and the respective activity data for one of the one or more registers;
        generating a second associate record based at least on the decision model and historical behavioral data for one or more associates;
        generating a first audit alert record based at least on the second associate record and the decision model;
        sending the one or more audit alerts to one or more handheld computing devices running a mobile application, wherein each audit alert indicates which of the one or more registers to audit, and wherein the mobile application is configured to display a notification to a user indicating which of the one or more registers to audit; and
        sending the first audit alert record to a database.

12. The method of claim 11, wherein the activity data includes one or more of:
    a number of associates on a respective register during a first time period, a number of no-sale transactions at a respective register during a second time period, a net cash in or out value for a respective register during a third time period, and a value of money in a respective register.

13. The method of claim 11, further comprising:
receiving a second audit alert record comprising a list of all recent audit alerts sent to the one or more handheld computing devices.

14. The method of claim 13, wherein the second associate record is further based on the second audit alert record.

15. The method of claim 11, wherein the one or more audit alerts are sent to the one or more handheld computing devices via a notification service.

16. A system comprising:
one or more registers, wherein each register is configured to house a respective first compartment;
a recycling device, wherein the recycling device comprises:
a housing configured to hold one or more first compartments;
one or more counting devices, wherein the recycling device is configured to receive each respective first compartment from the one or more registers and the one or more counting devices are configured to count money in each respective first compartment; and
a processor configured to calculate a monetary position for each of the one or more registers and transmit each respective calculated monetary position to a database;
one or more handheld computing devices running a mobile application; and
non-transitory computer readable medium having instructions stored thereon, wherein the instructions, when executed by at least one processor, cause a computing device to perform operations comprising:
storing a decision model comprising one or more audit rules;
receiving a respective calculated monetary position for one or more registers;
receiving activity data for at least one of the one or more registers;
generating a first associate record based at least on the decision model and one or more of the respective calculated monetary position for one of the one or more registers and the respective activity data for one of the one or more registers;
generating a second associate record based at least on the decision model and historical behavioral data for one or more associates;
generating a first audit alert record based at least on the second associate record and the decision model;
sending the one or more audit alerts to one or more handheld computing devices running a mobile application, wherein each audit alert indicates which of the one or more registers to audit, and wherein the mobile application is configured to display a notification to a user indicating which of the one or more registers to audit; and
sending the first audit alert record to a database.

17. The system of claim 16, wherein the activity data includes one or more of: a number of associates on a respective register during a first time period, a number of no-sale transactions at a respective register during a second time period, a net cash in or out value for a respective register during a third time period, and a value of money in a respective register.

18. The system of claim 16, further comprising instructions stored thereon that, when executed by the at least one processor, further cause the computing device to perform operations comprising receiving a second audit alert record comprising a list of all recent audit alerts sent to the one or more handheld computing devices.

19. The system of claim 18, wherein the second associate record is further based on the second audit alert record.

20. The system of claim 16, wherein the one or more audit alerts are sent to the one or more handheld computing devices via a notification service.

* * * * *

UNITED STATES PATENT AND TRADEMARK OFFICE
CERTIFICATE OF CORRECTION

| | | |
|---|---|---|
| PATENT NO. | : 12,086,780 B2 | Page 1 of 1 |
| APPLICATION NO. | : 17/644675 | |
| DATED | : September 10, 2024 | |
| INVENTOR(S) | : Kevin Philip Clay et al. | |

It is certified that error appears in the above-identified patent and that said Letters Patent is hereby corrected as shown below:

On the Title Page

Column 1, (72) Inventors:
Please delete "Ashley Renee Renee Greehey" and insert --Ashley Renee Greehey--

Signed and Sealed this
Twenty-sixth Day of November, 2024

Katherine Kelly Vidal
*Director of the United States Patent and Trademark Office*